March 25, 1947.  E. R. ALLING ET AL  2,418,063

METHOD OF REMOVING AND CONCENTRATING RESIDUE FROM CONTAINERS

Filed March 1, 1941  4 Sheets-Sheet 2

INVENTORS.
E. Roy Alling
and Henning A. Trebler
by Parker, Rockwow & Farmer
ATTORNEYS.

March 25, 1947.  E. R. ALLING ET AL  2,418,063
METHOD OF REMOVING AND CONCENTRATING RESIDUE FROM CONTAINERS
Filed March 1, 1941  4 Sheets—Sheet 4

INVENTORS.
E. Roy Alling
and Henning A. Trebler
By Parker, Rockwood & Farmer
ATTORNEYS.

Patented Mar. 25, 1947

2,418,063

UNITED STATES PATENT OFFICE 2,418,063

METHOD OF REMOVING AND CONCENTRATING RESIDUE FROM CONTAINERS

E. Roy Alling, Kenmore, N. Y., and Henning A. Trebler, Baltimore, Md., assignors to Rice & Adams Corporation, Buffalo, N. Y., a corporation of New York Application March 1, 1941, Serial No. 381,230

11 Claims. (Cl. 134—23)

This invention relates to rinsing methods that are particularly useful in milk receiving plants where milk and cream are received in cans or containers from the producers. The cans, after the contents have been emptied, are cleansed or washed, sterilized and dried for return to the producers. When the cans are emptied, a film of the milk or cream remains on the interior surfaces of the cans and covers, and in cold climates some of the milk or cream is sometimes frozen to the interior surfaces of the cans or covers, so that when the cans are emptied, some of the frozen milk or cream may remain attached to the interior surface of the can or cover. Heretofore the only effort to recover any of this adherent milk or cream has been by inverting the cans at the entrance end of a can washer, and allowing the cans to drain momentarily into a receptacle before being subjected to the cleansing operation. In the cleansing operation the inverted cans are first rinsed with water which removes a considerable portion of the adherent film of milk and cream, and the rinse mixture then discharged into a sewer or a stream. Officials are becoming increasingly insistent that this mixture of milk and water be not discharged into sewers or streams, but the dilution of the milk or cream in the rinse water is so great that the product has no appreciable commercial value.

One object of this invention is to provide an improved method of recovering a substantial portion of the milk or cream adhering to the interior surfaces of the cans and covers after emptying in a manner to make the recovered milk and cream a commercially valuable product.

Another object of the invention is to provide an improved method of cleaning the cans after emptying, with which prior objections against contamination or pollution of streams and discharge into sewers will be overcome, with which the loss due to the adherent milk and cream will be reduced, which will be relatively simple, which will require a minimum of apparatus and additional floor space, and which will not interfere appreciably with the normal routine of handling cans in a milk and cream receiving plant.

Another object of the invention is to provide an improved method for handling the cans after emptying at a milk and cream receiving plant, with which prior objections to pollution of streams and discharge of the rinse water into sewers will be overcome, with which the cans may be handled in the same manner and with the dispatch as previously, with which the waste of milk and cream received from the producers will be reduced to a minimum and which will require a minimum of additional apparatus and floor space to practice.

Other objects and advantages will be apparent from the following description of several embodiments of the invention, and the novel features will be particularly pointed out hereinafter in connection with the appended claims.

Figure 1:
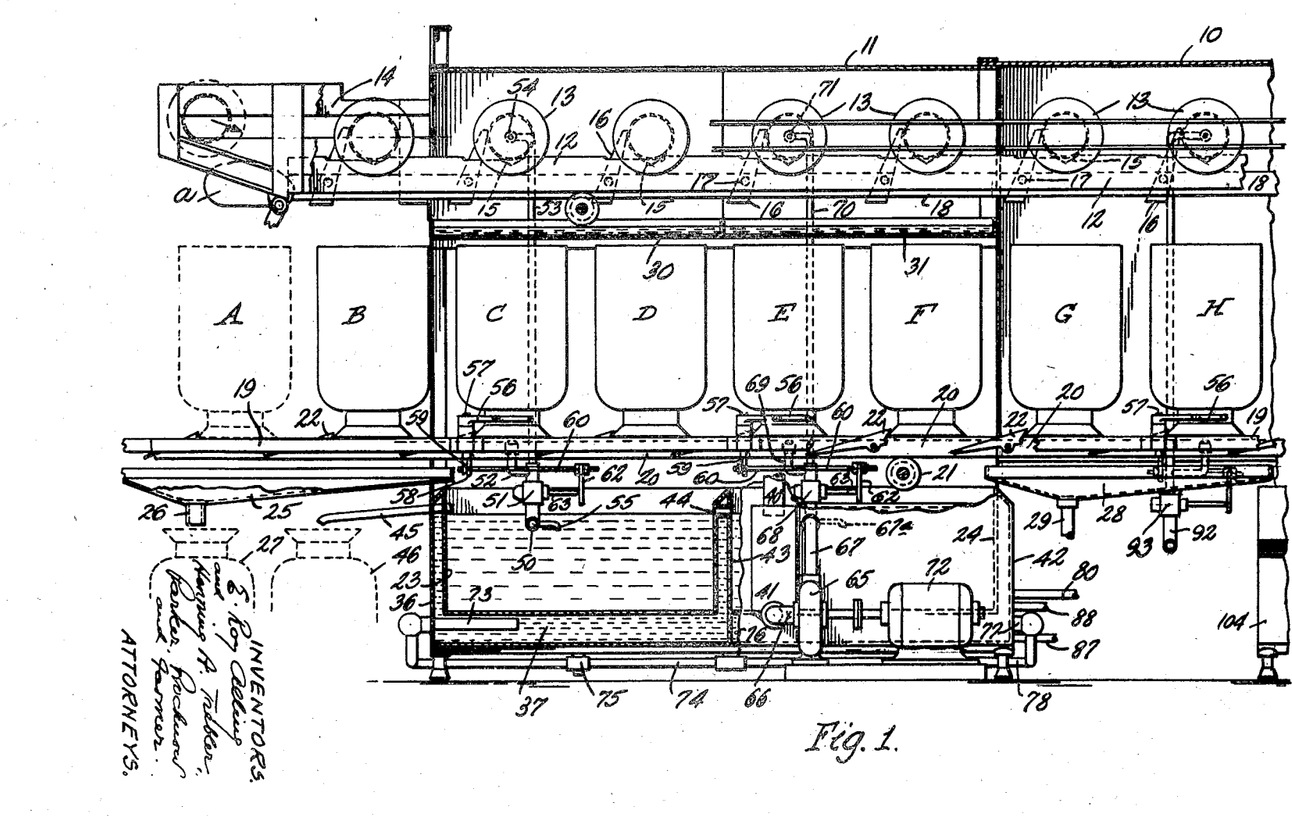
Fig. 1 is a side elevation, partly in section, of the forward end portion of a can washer, having added thereto mechanism for the recovery of milk and cream from the inverted cans before their entry into the washer, in accordance with this invention.
Figure 2:
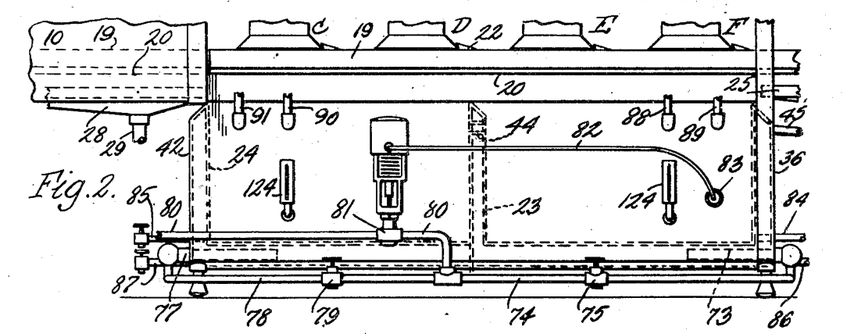
Fig. 2 is also a side elevation, but at the opposite side from that of Fig. 1, of a portion of the mechanism shown in Fig. 1.
Figure 3:
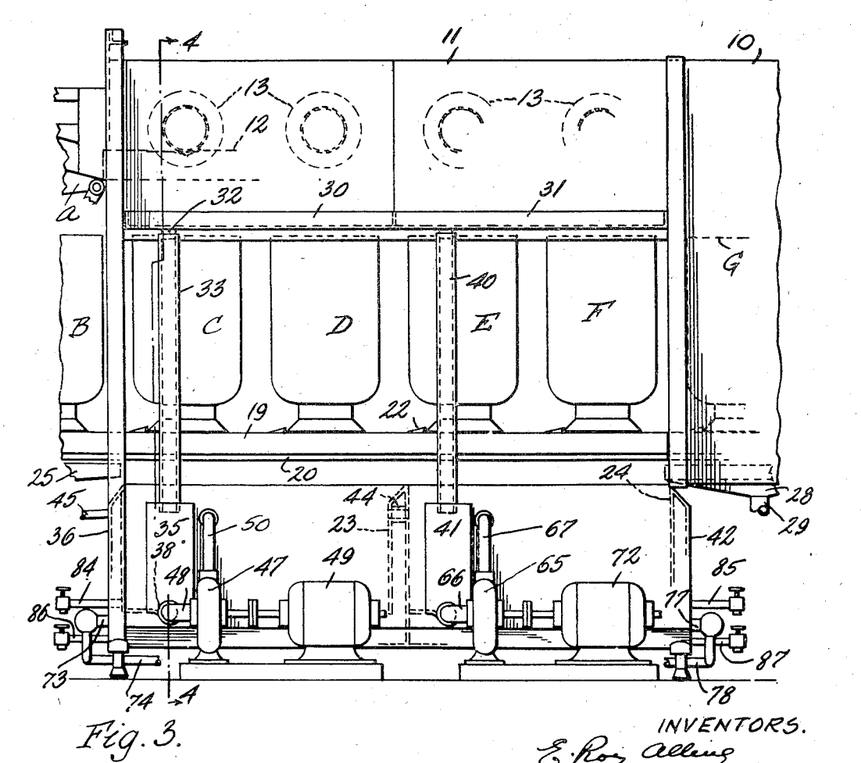
Fig. 3 is a side elevation of a portion of the mechanism shown in Fig. 1, and of the same side.

In the embodiment of the invention illustrated in Figs. 1 to 5, a conventional can washer 10 is employed, the forward or feed end thereof being shown in Figs. 1, 2 and 3. Certain details of such washers which are not material to the present invention are omitted from the drawings and description in order to avoid confusion with the details which are shown and described. To the forward or feed end of such a can washer we provide a housing 11 which forms an endwise or forward continuation of the can washer housing. In the conventional can washer 10 there is usually a rail 12 on which the covers 13 roll on edge as they travel through the can washer, and in this particular embodiment of the invention these rails 12 are extended forwardly through the auxiliary housing 11 to the usual cover feed basket 14. The cover rail 12 is provided at intervals along its length with notches or depressions 15 (Fig. 1) in which the covers momentarily rest and by which they are located in different stations for treatment. The covers are pushed along from one station to another by dogs or pawls 16 pivoted at 17 to a reciprocating dog bar 18.

The dogs or pawls 16 are normally weighted at their tail ends so as to assume the positions shown in Fig. 1 in which their upper ends engage the necks of covers rolling on edge, and propel the covers forwardly when the dog bar 18 is moved endwise in one direction. The return movement of the dog bar 18 will carry the dogs 16 to the left in Fig. 1, and the upstanding ends of each dog will ride under the cover next to the rear thereof, that is, be cammed downwardly as the dog passes under that cover, to a new feeding position behind the cover under which it has just passed. This is commonly employed mechanism for propelling the covers step by step through a can washer. The dog bar 18 is also extended forwardly, or to the left in Fig. 1, and provided with spaced dogs 16 the same as within the housing 10 so as to feed the covers in housing 11 forwardly (to the right, Fig. 1) step by step in the same way that they are propelled through the can washer 10.

Similarly the conventional can washer has a plurality of rails 19 (Fig. 4) which extend side by side, in parallel spaced relation to one another, through the housing of the washer 10 at a point below the cover guiding means. Between certain of the rails 19 are disposed dog bars 20 which are mounted, in any suitable manner such as upon a plurality of rollers 21, for endwise reciprocation, and each of these dog bars 20 carries a plurality of dogs 22 pivoted thereto at intervals therealong, which intervals correspond to the spacing between successive stations for cans in the washer. These dogs are, as well known in the art, overweighted at their tail ends so that they normally assume the upstanding positions shown in full lines in Fig. 1, and when they are moved to the left in Fig. 1 each upwardly extending end is cammed downwardly by the next succeeding can, in the rear until it clears the neck of that can, whereupon it automatically resumes the upstanding position shown in Fig. 1.

When the dog bars 21 are moved to the right in Fig. 1, which is in a feeding direction, the dogs 22 engage the necks of the inverted cans which are resting upon the track rails 19 and push the cans along the rails from one station to another, the movement of all the cans in the washer being simultaneous. Inasmuch as this arrangement is well known in the art, a detailed description will be omitted. The rails 19 and the dog bars 20 are, however, in accordance with this invention also extended through the housing 11 and beyond the forward end of the housing which will be to the left in Fig. 1 so as to guide and propel the inverted cans through a plurality of stations before they reach the entrance end of the usual can washer 10. The extensions of the dog bars 20 have also the pivoted dogs 22 arranged thereon at intervals in the same way that they are arranged in the can washer 10, for feeding the cans step by step into and through the auxiliary housing 11 and into and through the housing of the washer 10.

Within the auxiliary housing 11 and beneath the rails 19 are arranged a pair of tanks 23 and 24 which open upwardly below the rails 19, so that liquids may drain from the inverted cans supported on the rails 19 downwardly into the tanks 23 and 24. The tanks 23 and 24 may, if desired, be formed of a common structure so as to constitute a duplex tank structure in which the tanks are arranged in tandem along the path of travel of the cans on the rails 19. Outside of the auxiliary housing 11, at the feed or entrance end of the same, a drain pan 25 is disposed below the rails 19 so as to collect the drip from any inverted cans resting upon the projecting ends of the rails 19. A drain pipe 26 in the bottom of this pan 25 discharges any collected drippings into a suitable receptacle 27. Within the can washer 10, at the entrance or feed end, another pan 28 is similarly disposed below the rails 19 so as to collect drip from the inverted cans resting upon the rails 19 in the zone above the pan 28, and a pipe 29 connects the pan 28 to the sewer or any disposal device.

In the upper part of the auxiliary housing 11 and below the cover rail 12, pans 30 and 31 are arranged in tandem. All liquid dripping or draining from the covers in the auxiliary housing 11 will fall into the pans 30 and 31. The pan 30 is provided with a drain pipe 32 (Figs. 3 and 4) which opens into the upper end of a conductor pipe 33. The pipe 33 descends along one side of the housing 11 and opens into the upper end of a chamber 34 (Fig. 4) which is provided in a box-like protuberance 35 carried at one side of the tank 23. A jacket 36 surrounds the sides and bottom of tank 23 so as to provide with the walls of tank 23 a chamber 37 for a heating fluid. The protuberance 35 projects from the jacket and with the jacket forms the chamber 34.

The chamber 34 is connected with the interior of the tank 23 by a passage 38 (Fig. 4) at the bottom of the tank, and the conductor pipe 33 opens into the upper end of the chamber 34. A screen 39 is disposed diagonally across the chamber 34 between the ends thereof from the upper edge of the outer wall of the protuberance 35 to the lower opposite corner edge of the chamber 34. Similarly the pan 31 is connected by a conductor pipe 40 (Fig. 3) with a box-like protuberance 41, similar to the protuberance 35. The protuberance 41 is connected with the tank 24 by a passage corresponding to the passage 38 and contains another screen 39 in its chamber. The tank 24 is similarly provided with a jacket 42 (Fig. 1) but for simplicity the end wall 43 of the jacket for tank 23 may form the adjacent end wall of the tank 24. The chambers of the tanks 23 and 24 are preferably connected at their upper ends by an overflow pipe 44, and the tank 23 may also have an overflow pipe 45 which delivers the overflow into a container 46.

Figures 4, 5, 6, 7:
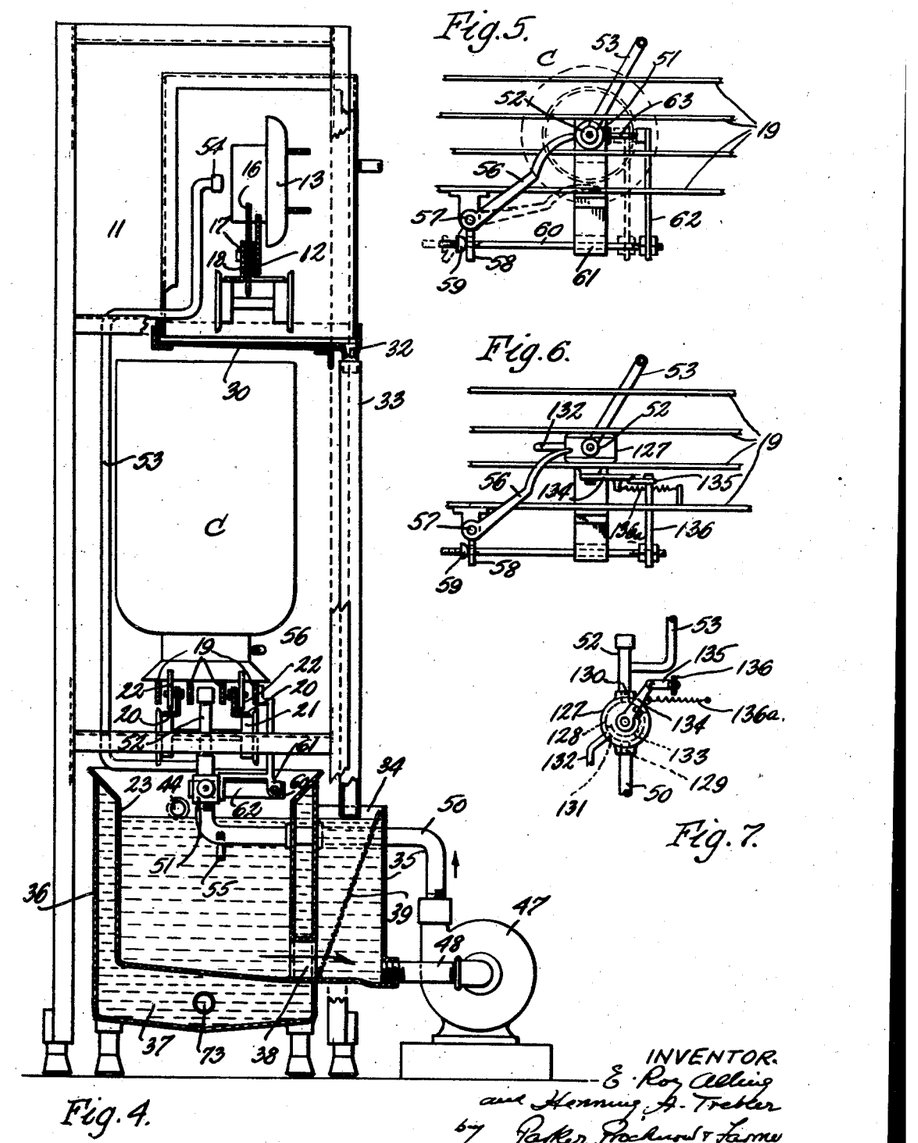
Fig. 4 is an end elevation of the entrance end of the mechanism shown in Figs. 1 to 3, but with certain parts in transverse section approximately along the line 4—4 of Fig. 3.
Fig. 5 is a plan of the valve operating mechanism.
Fig. 6 is a similar plan of valve operating mechanism employing a two-way valve that may be employed in place of that shown in Figs. 1 to 5.
Fig. 7 is an elevation of a portion of the same.

A suitable pump 47 (Figs. 3 and 4) such as a centrifugal pump is connected at its intake side by a pipe 48 to the lower part of the chamber 34 beneath the screen 39, so as to draw water from the tank 23 beneath the screen 39. The pump 47 is coupled to and driven by any suitable source of power such as an electric motor 49, and during the period of operation of this apparatus, the motor 49 and pump 47 are continuously operating. The outlet connection of the pump 47 is connected by a pipe 50 to a valve 51 (Figs. 1 and 4). A pipe 52 extends from the valve 51 into a position between the two center rails 19 (as shown in Fig. 4) so as to discharge upwardly into the interior of an inverted can disposed over the pipe 52, a stream of water passing the valve 51 from the pump 47. A branch pipe 53 also extends from the pipe 52 upwardly to a position at one side of the path of the covers 13 and terminates in a discharge nozzle 54, which directs a stream of the water from the pump 47 against the inside face of any cover 13 which happens to be in a notch 15 in front of the nozzle and in a position which represents a station for the cover. Thus when valve 51 is opened, water will be delivered from the pump 47 upwardly into the interior of an inverted can to rinse out the interior thereof, and also against the inside face of the corresponding cover.

The water draining from this can and cover returns to the tank 23 where it is mixed with the other water in that tank, and the mixture supplied to the pump 47 for the rinsing of further cans and covers which pass in succession through the same stations in the housing 11. A small bypass is preferably provided between the pipe 50 and the interior of the tank 23 so as to discharge a relatively small stream of water from the pipe 50 directly back into the tank 23 to keep the contents of the tank 23 in agitation and movement at all times. Since the pipe 50 in this particular embodiment of the invention passes through a side wall of the tank 23, the bypass is easily provided by a short pipe 55 leading from the portion of pipe 50 within the tank 23 and discharging downwardly into the tank so as to set up a current in the water in the tank 23. Since a heating fluid is supplied to the chamber 37 surrounding the tank 23, the water in the tank 23 is heated by conduction through the wall of the tank, and unless the water in the tank 23 is kept somewhat in agitation or motion, there is some danger that the milk or cream carried in the tank 23 may cook onto the walls of the tank 23.

The valve 51 is suitably operated by the cans as they move into positions above the pipe 52, and various can operated valves are available in the market which will be suitable for this purpose. The particular mechanism illustrated for this purpose includes an arm 56 (Fig. 5) in a position to be engaged by the neck of an inverted can, as that can moves into a position above the pipe 52, and cammed a short distance sidewise of the path of travel of the cans. This arm 56 is fixed on a pivot shaft 57 (Fig. 5) which carries an arm 58 that operates through a collar 59 on a reciprocating rod 60, to move the latter endwise. The rod 60 is suitably supported for endwise movement in a bearing 61, and carries an arm 62 which engages with and depresses the valve stem 63 of the valve 51. A spring (not shown) within the valve 51 acting on stem 63 urges it outwardly and through the arm 62, rod 60, collar 59 and arm 58 urges arm 56 into the path of the cans.

A pump 65 (Figs. 1 and 3) similar to the pump 47 is connected at its intake side by a pipe 66 to the chamber of protuberance 41 and at its outlet side by a pipe 67 to a valve 68 similar to the valve 51. A pipe 69 leads from the valve 68 to a position beneath an inverted can that is over the tank 24 and between the center rails 19 on which the inverted cans slide so that water from the pump 65 passing the valve 68 will be discharged as a stream upwardly into the interior of any inverted can which happens to be directly above it. Similarly a pipe 70 also leads from the valve 68 to a position alongside the covers and terminates in a nozzle 71 for directing a stream of water against the inside face of any cover in the cover station above the can station aligned with the pipe 69. The valve 68 is operated by the cans through mechanism similar to that described for operating the valve 51, and corresponding parts are given corresponding reference characters. The pump 65 is directly coupled to and driven by a motor 72, and pump 65 will be continuously operated in the same manner as pump 47. The pipe 56 also has a short bypass pipe 67a corresponding to the pipe 55, which discharges a portion only of the water from the pipe 56 back into the tank 24 to keep the contents of the latter in agitation or movement and thus prevent milk or cream in the water from cooking onto the wall of that tank.

The liquid in the jacket chamber 37 of the tank 23 may be heated in any suitable manner such as by one or more steam injector devices 73 (Fig. 1) which are supplied with steam through a pipe 74 controlled by an adjustable valve 75. The chamber 76 formed between the jacket 42 and the tank 24 (Fig. 1) also has its contents heated in a similar manner by one or more steam injectors 77 which are supplied with steam by a pipe 78 controlled by an adjustable valve 79. The pipes 74 and 78 are connected to a common steam supply pipe 80 (Fig. 2) which is controlled by a valve 81. The valve 81 is in turn thermostatically controlled through a conduit 82 from a thermal element 83 which is inserted into the tank 23, so that the steam admitted to the heaters for the jacket chambers of the tanks 23 and 24 will be sufficient to maintain desired temperatures of water in the tanks 23 and 24. These thermally controlled valves 81 are common in the art and therefore are only shown conventionally and briefly referred to. By varying the relative adjustments of the valves 75 and 79, the temperatures of the liquids in the jackets for the two tanks may be given a definite temperature ratio or difference, and the temperature of the water in the tank 23 will be directly controlled through thermal device 83 so that there will be an indirect temperature control for the water in the tank 24.

The tank 23 is provided with a valve controlled drain 84 (Figs. 2 and 3) and the tank 24 is provided with a valve controlled drain 85. The chamber between the tank 23 and its jacket is provided with a valve controlled drain 86, and the chamber between the tank 24 and its jacket is also provided with a valve controlled drain 87. To facilitate the addition of water to the tank 23 we may provide an inlet pipe 88 (Fig. 2), and the chamber within the jacket for the same tank may have a filling pipe 89. Similarly the tank 24 has a filling pipe 90 for the chamber between it and its jacket and a filling pipe 91 opening directly into the tank.

The operation of the apparatus shown in Figs. 1 to 5 will now be described. The different successive stations through which the cans move are designated in Figs. 1 to 4, in order, as A, B, C, D, etc. The dog bars 20 of the can washer are reciprocated endwise at desired intervals by suitable mechanism (not shown) which is common in can washers, and as the dog bars 20 are reciprocated they feed the cans step by step in succession through the stations A, B, C, D, E, etc., and into and through the can washer 10, with intervals of rest between the different steps or movements. Similarly the dog bars 18 of the can washer which propel the covers 13 through the washer 10 are reciprocated endwise at intervals by the mechanism of the washer, which is well known in the art, and in timed relation to the movement of the cans. The reciprocation of the dog bars 18 for the covers causes similar movements for the covers through corresponding stations in the auxiliary housing 11.

The cans, after emptying, are placed in inverted positions in succession on the rails 19, Fig. 1, in advance or at the left of station A, where some of the milk or cream which is retained within any can may drain out and fall into the pan 25 and be delivered into the receptacle 27. Immediately after the can is inverted and placed as stated, the operator pushes it forwardly into the station A where it can be picked up by the first dogs 22 at the next operation of the can propelling dog bars. The pan 25 extends beneath the station B so as to collect all of the drip from the cans while in both stations A and B. At the same time that the can is pushed into the station A, the attendant places the cover for that can in the cover feeding box 14 (Fig. 1), the cover being retained in the box 14 until the next operation of the dog bars when a member $a$ operated from the dog bar mechanism in a manner not shown but common in the art, lifts the cover in the feed box 14 and starts it rolling along the rail 12 with sufficient impulse to cause the cover 13 to roll into the first notch 15 which will be above the station B. The cans and covers will then be moved step by step first through the auxiliary housing 11 and then through the washer 10.

The tanks 23 and 24 are partially filled with water at the start of an operation, and the pumps 47 and 65 are placed in operation. When an inverted can moves into the station C, the neck of that can cams slightly to one side an arm 56 at that station, which through the mechanism shown in Figs. 1 and 5, opens the valve 51, whereupon water from the tank 23 is delivered with considerable velocity anad force upwardly into the interior of the inverted can in station C. At the same time water is also delivered by the pipe 53 against the inside of the cover 13 above station C. The streams of water rinse out the cans and covers, and the water and milk or cream removed thereby drains down into the tank 23 where they are mixed with the other fluid. The mixture is recirculated through the pump back into the can and cover in station C.

A portion of the water delivered by the pump will pass through the bypass 55 back into the tank 23 to keep the water in that tank in sufficient agitation or motion to remove all danger of any of the milk or cream in the water cooking on the heated sides of the tank. The stream delivered by the bypass 55 is relatively small compared to the streams delivered to the can and cover in station C, so that while the bypass 55 is always open, there is sufficient water under pressure delivered by the pump 47 to supply the streams to the can and cover in station C.

In the next cycle of operation of the dog bars, the can and cover which have just been rinsed in station C will be moved forwardly into station D and there they can then drain into the pan 30 and tank 23. At the same time that the can and cover were moved from station C to station D, another can which has been placed in station B and the cover in the feed box 14, will be moved into the station C and there subjected to the same treatment which has just been described. In the next cycle of operation a can and cover will be moved from station D to station E where they are subjected to another rinsing by water from pump 65 taken from the tank 24, the operation being similar to that just described for the tank 23 and the stations C and D. The cans and covers are rinsed with the water from tank 24 while in station E and allowed to drain while in station F.

In the next cycle of operation the can and cover will be moved from station F to station G where they are allowed to drain into the pan 28. In the next cycle of operation a can and cover will move from station G to station H where they are subjected to the usual prerinse found in can washing machines, the drain being collected from pan 28 and conducted to a sewer. The water for this prerinse is supplied through pipe 92 from a service supply water source and is controlled by a valve 93 which is opened by the can in the same manner that valves 51 and 68 are opened by the cans in stations C and E. The water in each tank 23 and 24 is heated through the jackets, and the hot water thus used to rinse the cans initially while in stations C and E will wash out any frozen milk or cream that may be adhering to the interiors of the cans and covers.

By using the water in tank 23 again and again to rinse the cans and covers as they pass through the station C in succession, the concentration of removed milk and cream in the water is increased. This re-use of the water in tank 23 is continued until the concentration of milk and cream therein is sufficient to make the mixture a marketable product such as for hog feed and chicken feed. It will be noted that the water in tank 24 which is used for the second rinsing is collected separately and recirculated in the same manner, and while a great deal of the milk and cream residue or film has been removed in stations E and F, the concentration of the water in tank 24 will not increase as rapidly as it does in tank 23. The mixtures in tanks 23 and 24 may be kept separate from one another and removed when the desired concentration is reached, but in the example illustrated in Figs. 1 to 4, the overflow pipe 44 from tank 24 to 23 allows the increase in tank 24, such as due to the added milk and cream, to overflow into the tank 23 and displace some of the liquid from tank 23 through pipe 45 into the receptacle 46.

If desired, water can be added continuously at a slow rate to the tank 24 during a run and this will keep the liquid in tank 24 gradually replenished with displacement of an equivalent amount through the overflow pipe 44 into tank 23, and this will cause an equivalent displacement into the receptacle 46. The machine will preferably be operated without this additional water added to tank 24 until after the concentration of milk and cream in the water of tank 23 has reached a desired concentration, and then the addition of a small stream of water to tank 24 during the remainder of the run will cause a displacement of the water from tank 23 of desired concentration into the receptacle 46. The amount of milk and cream remaining in the cans when they reach the stations G and H is so small that whatever is removed and drained out through the pipe 29 will not be objectionable when discharged into a stream or sewer, and we have therefore overcome a very pressing problem of the officials in disposing of the rinsings from milk and cream cans.

Figure 8:
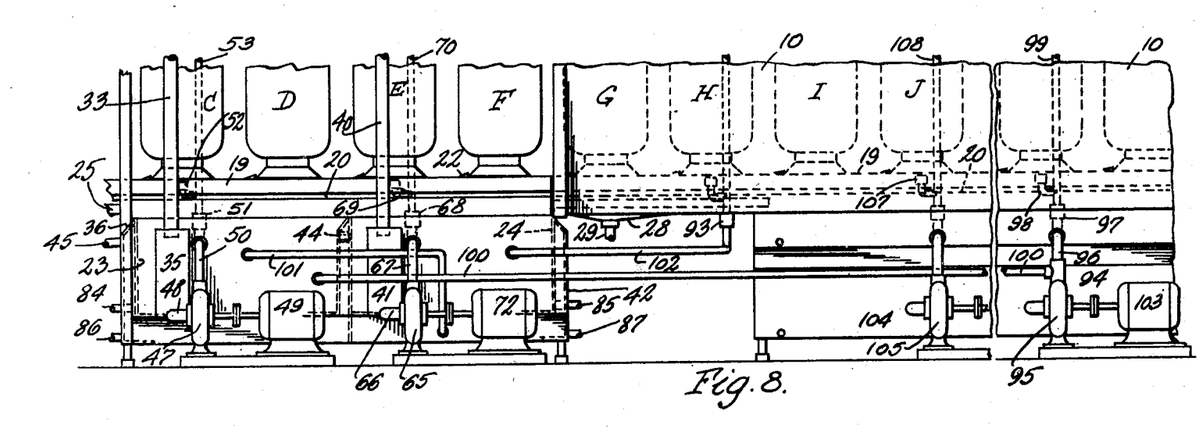
Fig. 8 is a side elevation of a portion of the conventional can washing machine, to the forward or feed end of which this improved mechanism is attached, and illustrating a modified manner of heating the water in the rinsing tanks of the milk and cream recovery apparatus.

Referring now to the embodiment of the invention shown in Fig. 8, the construction is the same as for Figs. 1 to 5 except for the manner in which the water in the tank jackets is heated and supplied. The parts of Fig. 8 which correspond to similar parts in Figs. 1 to 5 have corresponding reference characters. In this embodiment of the invention the jacket chambers for tanks 23 and 24 are not heated by the steam injectors but by the circulation of a liquid therethrough. For this purpose heated liquid is obtained from the can washer. In the can washer, after the cans have been subjected to a washing operation with caustic or other detergent, they are subjected to a rinsing. For this rinsing a tank 94 is disposed beneath the path of travel of the cans. The rinse water therein is heated in any suitable manner (not shown) to a temperature of approximately 180° or more. This rinse water is withdrawn from tank 94 by a pump 95 and delivered by a pipe 96 to a valve 97. From the valve a pipe 98 delivers rinse water upwardly into an inverted can disposed thereover and a branch pipe 99 delivers some of the rinse water to the covers to rinse the latter as usual in can washing machines.

It is desirable to renew or replenish the rinse water in tank 94, and for that purpose water is added slowly in an approximately continuous manner. A pipe 100 is connected at one end to the pipe 96 leaving the pump and at its other end to the jacket chamber of tank 23, so that a portion of the hot rinse water delivered by the pump 95 will be conveyed to the jacket chamber for the tank 23. A pipe 101 opens out of the jacket chamber of tank 23 at another point and opens into the jacket chamber of tank 24. A pipe 102 opens out of the jacket chamber of tank 24 at a point spaced from the opening of pipe 101 into that jacket chamber, and leads to the usual prerinse valve 93 of the can washer. Thus the water used for the prerinse for the cans while in station H is obtained from the rinse tank 94 of the can washer and is circulated first through the jacket chamber of tank 23 and then through the jacket chamber of tank 24 to the prerinse valve.

The operation of the valve 93 to cause prerinsing of the cans and covers, will cause a movement of this heated water through the jacket chambers of tanks 23 and 24, and thus will supply a continuous heating medium which, in many instances, will be adequate heating. This provides a continuing renewal of the rinse water for tank 94, and the heat of that rinse water of the usual can washer is not lost but is utilized first to heat the rinsing water in tanks 23 and 24 and then for directly prerinsing the cans in the washer. The pump 95 is operated in any suitable manner such as by a motor 103. The cans in the station J are subjected to an alkaline or other wash, that is, a wash with a solution containing alkali or other detergent normally contained in tank 104. The washing solution in tank 104 is withdrawn by a pump 105 and delivered to a nozzle 107 which directs a stream of this washing solution upwardly into an inverted can in station J and a branch pipe 108 conveys a part of this washing solution to the covers to wash the same. Otherwise the operation is the same as for Figs. 1 to 5.

Figure 9:
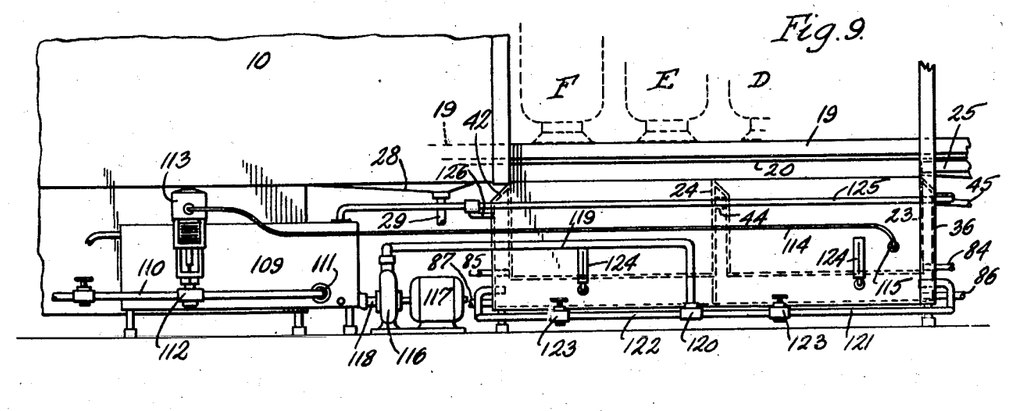
Fig. 9 is a side elevation of the improved mechanism as applied to the feed end of a can washer, but illustrating still another modification of the means for heating the rinsing water for the milk recovery tanks.

In the embodiment of the invention shown in Fig. 9, the construction is generally as explained for Figs. 1 to 5, except that a further modification is made in the means for heating the water in the tanks 23 and 24. In this embodiment of the invention, parts corresponding to similar parts in Figs. 1 to 5 are given similar reference characters. A reservoir 109 is disposed alongside of or beneath the can washer, and steam supplied from any suitable source, such as a pipe 110, is admitted to a steam injector 111 which is disposed within the reservoir 109. A valve 112 in the pipe 110 controls the admission of steam to the injector and thereby controls the temperature of the water in the reservoir 109. The valve 112 is operated by thermally responsive mechanism 113 which is connected by a control tube 114 to a thermal element 115 disposed in the tank 23. Thus the steam admitted to the injector 111 is directly responsive to the temperature of the water in tank 23 which is used for the first rinsing of the cans and covers while in station C.

Through this arrangement, the temperature of the water in the reservoir 109 will be regulated in response to the temperature of the water in tank 23. A pump 116, driven by a motor 117, is connected at its intake side by a pipe 118 to the reservoir 109, so as to withdraw water therefrom. At its output side the pump 116 is connected by a pipe 119 to a T 120. A pipe 121 leads from the T to one end of the jacket chamber for the tank 23, and a pipe 122 also leads from the T 120 to one end of the jacket chamber for the tank 24. Valves 123 in the pipes 121 and 122 enable independent adjustment of the relative rates of flow of the water from the pump 116 to the jacket chambers for the tanks 23 and 24, so as to maintain any desired temperature differential in the water of the jacket chambers for tanks 23 and 24. Suitable temperature indicating devices 124 which extend into the chambers of the jackets for the tanks 23 and 24, indicate at all times the temperatures of the water in those jacket chambers. Water is removed from the jacket chamber of tank 23 by a pipe 125, and from the jacket chamber of tank 24 by a pipe 126 which connects with pipe 125. The pipe 125 leads back to the reservoir 109.

It will thus be observed that the heated water in the reservoir 109 is withdrawn by pump 116, circulated through branch pipes to the jacket chambers of tanks 23 and 24, and then back through the pipes 125 and 126 to the reservoir. Since the water in reservoir 109 is heated to the extent necessary to maintain a desired temperature of the water in tank 23, the water in the tanks 23 and 24 may be maintained at any desired temperatures which are suitable for the purpose. In cold climates or at cold temperatures, obviously more heat will be necessary than in the summer months or in warm climates. Otherwise the construction and operation is the same as explained for the structure shown in Figs. 1 to 4.

Referring now to Fig. 6, a slightly different modification of the means for bypassing some of the water of tanks 23 and 24 is illustrated. Each of the valves 51 and 68 of Figs. 1 to 5 may be replaced by a two-way valve 127 having a rotor 128 (Fig. 7). The casing of valve 127 has an inlet port 129 to which the pipe 50 or 67 is connected, and an outlet port 130 to which the pipes 52 and 53 are connected. The casing is also provided with a port 131 to which is connected a pipe 132 which discharges water back into the tank 23 when this valve takes the place of the valve 51 of Figs. 1 to 4, and back into the tank 24 when a valve of this type replaces the valve 68. The pipe 132 thus replaces the pipe 55 or 67a of Fig. 1. The rotor 128 of the valve 127 is provided with a channel 133 which, when the rotor is oscillated, connects the port 129 alternately with ports 130 and 131. The rotor 128 is oscillated by an arm 134 which is connected at its free end to a rod or link 135, which is in turn pivotally connected to one end of an arm 136 corresponding to arm 62 of Fig. 5 and carried by rod 60.

In this example the lever arm 56 when cammed sidewise by a can oscillates the valve rotor to place the groove 133 thereof in a position to connect the ports 129 and 130 and interrupt the connection to port 131. When the can in engagement with arm 56 moves into the next position, the cam arm 56 will be moved by a spring 136a connected to arm 136 back into the initial position shown in full lines in Fig. 7 in which the port 129 is disconnected from the port 130 and is reconnected to the port 131, so as to by-pass back to the tank 23 all of the water delivered by the pipe 50 when the valve 127 is connected to the pipe 50, and to the tank 24 when the valve 127 is substituted for the valve 68 of Fig. 1. Various other arrangements for operating two-way valves and other valve constructions for accomplishing this result may be adopted.

It will be understood that various changes in the details and arrangements of parts, which have been herein described and illustrated in order to explain the nature of the invention, may be made by those skilled in the art within the principle and scope of the invention, as expressed in the appended claims.

We claim as our invention:

1. An improved method of reducing waste in a liquid receiving plant of the type where milk or the like is received in a plurality of cans, the cans emptied, the contents weighed and sampled, and the cans cleansed for return to the producers, which comprises rinsing the interiors of each of said cans, first with water from one body and free of added detergents, and then with water free of added detergents from another and separate body, with said one body of water used again and again for one rinse of each of said cans and said another body of water again and again for another and subsequent rinse of each of said cans, whereby the major amount of the film of milk or the like on the interiors of the cans will be removed and taken up in said bodies of water, and by the re-use of the same water of each body for rinsing of a plurality of cans the concentration of milk or the like in each body of the water may be increased to a marketable concentration in said one body of water and to a lesser extent in said another body of water, removing said one body of used rinse water only after it reaches said marketable concentration, and then washing the rinsed cans with water having an added detergent.

2. An improved method of reducing waste in a liquid receiving plant of the type where milk or the like is received in a plurality of cans, the cans emptied, the contents weighed and sampled, and the cans cleansed for return to the producers, which comprises passing the cans while upside down in succession along a selected path through a plurality of stations, directing a stream of one body of water free of added detergent into the interiors of said cans in succession while they are in one of said stations, discontinuing said stream whenever no can is in that station and while cans are moving from station to station, collecting said used water and using it over and over to rinse successive cans in that station, directing a stream of a different and separate body of water free of added detergent into the interiors of said cans in succession while they are in another of said stations further along said path in the direction of travel of the cans, discontinuing said second stream whenever no can is in that station and while cans are moving from station to station, collecting this used water of said different body and using it over and over to rinse successive cans in that station, withdrawing rinse water from said one body after it has reached a marketable concentration with rinsed out milk, replacing such withdrawn water with water from said different body, adding an equivalent amount of fresh water without added detergent to said different body, and then washing the cans with water having an added detergent in a still further subsequent station.

3. The improved method of recovering milk residue remaining in cans after the cans have been emptied of milk or cream which comprises rinsing said cans while inverted, in succession first with one selected body of water free of added detergents and used again and again by directing a stream of said water under pressure against the interior of each of said cans, allowing the inverted cans to drain, then rinsing the cans in succession with another body of rinse water also free of added detergents but having a lesser concentration of milk and cream therein used again and again for second rinsings by directing a stream of said second body of water against the interior of said inverted cans for the second rinsings, allowing said inverted cans again to drain, continuing this rinsing of cans until the concentration of milk residue reaches a commercially marketable concentration and then subjecting the cans to a cleansing operation, employing an added detergent different than plain water to remove any remaining milk from the cans.

4. The improved method of recovering residues of milk and cream remaining in cans after the cans have been emptied, which comprises passing said cans, while inverted, in a selected path, collecting the drip containing removed residue from said cans while in an initial station in said path, rinsing the inverted cans while in another and subsequent station in said path by directing a stream of a selected body of water free of added detergents against the interior surface of said cans, collecting drip with removed residue from said cans while in another subsequent station in said path, mixing the drainings from the cans while in said subsequent stations with said body of water, and using said mixture again and again to rinse other cans in succession while in said first mentioned subsequent station until the concentration of milk and cream residue in said stream reaches a commercially marketable concentration, and then subjecting the rinsed cans to a cleansing operation employing an added determent to remove from the cans any final adhering residue.

5. The improved method of recovering residues of milk and cream remaining in cans after the cans have been emptied, which comprises passing said cans, while inverted, in a selected path, collecting the drip containing removed residue from said cans while in an initial station in said path, rinsing the inverted cans while in another and subsequent station in said path by directing a stream of a selected body of water free of added detergents against the interior surface of said cans, collecting drip from said cans while in another subsequent station in said path, mixing the drainings from the cans while in said subsequent stations with said body of water, using said mixture again and again to rinse other cans in succession while in said first mentioned subsequent station until the concentration of milk and cream residue in said mixture is a commercially marketable concentration, further rinsing the cans by directing another and separate body of water also free of added detergents against the inner surface of each can while inverted and in still another and subsequent station in said path, allowing said further rinsed cans to drain while in the next subsequent station in said path, collecting the drainings from said cans while in said last two mentioned subsequent stations and mixing them with the second body of liquid, using this last mixture as the stream of rinsing water for said further rinsing of additional cans, displacing said commercially marketable mixture into a reservoir, replacing it with said another body of rinse water, and then subjecting the rinsed cans to a cleansing operation with an added detergent to complete the removal of residue from said cans.

6. The improved method of recovering milk and cream residue from the interiors of cans, after the cans have been emptied, which comprises passing each of said cans in succession and while inverted through a plurality of different stations along a prescribed path, heating a body of rinse water by contact with a heated surface, withdrawing a portion of said water and forcibly discharging it into the cans successively as aid cans successively pass through one station in said path, interrupting such discharge when no can is in said station, collecting the water and the drippings from said cans so receiving water, while in said one station, mixing the drippings and water with the remainder of said body of water and using the mixture again and again for rinsing successive cans as they pass through said one station, and continuously bypassing a portion of said withdrawn mixture back into said body to keep the latter in agitation regardless of the presence of a can in said one station, and using the unbypassed portion of the withdrawn mixture to rinse said cans.

7. The improved method of recovering from the interior of a container in which a material is transported, after the container has been first emptied of said material, a maximum of the residue of said material which adheres to the container after said emptying, in a concentration which is marketable, which comprises rinsing the interiors of each of said containers in succession with a selected body of rinsing water free of added detergents, used over and over in rinsing successive containers, to remove some of the residue, subjecting the interiors of each of said containers in succession to a subsequent rinse with another and separate body of rinsing water also free of added detergents, with said separate body used over and over to remove further residue, removing rinse water from said selected body only after a desired commercially marketable concentration of residue therein has been obtained, replacing the removed water with water from said separate body, replacing the withdrawn water of said second body with fresh rinse water also free of added detergents whereby the residue and rinse liquid withdrawn in the operation may all be of a marketable concentration, and a maximum amount of the residue may be removed from the containers, and then subjecting the containers to cleansing with water containing an added detergent which is kept separate from the rinse water.

8. The improved method of recovering from the interior of a container in which a material is transported, after the container has been first emptied of said material, a maximum of the residue of said material which adheres to the container after said emptying, in a concentration which is marketable, which comprises rinsing the interiors of each of said containers in succession with a selected body of rinsing water free of added detergents, used over and over in rinsing successive containers, to remove some of the residue, subjecting the interiors of each of said containers in succession to a subsequent rinse with another and separate body of rinsing water also free of added detergents, with said separate body, used over and over to remove further residue, removing rinse water from said selected body in increments, only after a desired commercially marketable concentration of residue therein has been obtained, replacing the removed rinse water with increments of rinse water from said separate body, and replacing the withdrawn liquid of said second body with increments of fresh rinse water also free of added detergents, whereby the residue and rinse liquid withdrawn in the operation may all be of a marketable concentration, and a maximum amount of the residue may be removed from the containers, and then subjecting the containers to cleansing with water containing an added detergent which is kept separate from the rinse water.

9. The improved method of recovering from the interior of a container in which a material is transported, after the container has been first emptied of said material, a maximum of the residue of said material which adheres to the container after said emptying, in a concentration which is marketable, which comprises rinsing the interiors of each of said containers in succession with a selected body of rinsing water free of added detergents, used over and over in rinsing successive containers, to remove some of the residue, subjecting the interiors of each of said containers in succession to a subsequent rinse with another and separate body of rinsing water also free of added detergents, with said separate body used over and over to remove further residue, progressively displacing as a stream, liquid from said selected body by the addition to that body progressively of liquid from said separate body, solely while the concentration of said material in said selected body is commercially marketable, displacing liquid from said separate body into said selected body progressively by the addition of fresh rinse water also free of added detergents to said separate body, whereby there will be a progressive discharge of rinse liquid with a desired concentration of residue therein, and a maximum amount of residue will be removed from said containers by said successive rinsings, then applying wash water with an added detergent against the interior of said container to remove therefrom all trace of said material, and keeping the last mentioned wash water separate from said rinsing waters, whereby said residue may be largely made salable and contamination of said wash water with added detergent may be prevented.

10. The method of recovering from the interiors of containers a residue, adhering thereto, of a material which is damaged by excessive heat, which comprises progressively withdrawing a part only of a body of rinse liquid and directing it as a stream into the interiors of said containers in succession to rinse the containers, with the same liquid used over and over to remove some of the residue from the containers, heating the liquid by direct contact of the unwithdrawn part of the liquid body with a heated surface, and continuously diverting a portion only of the withdrawn liquid from said stream before it is discharged into said containers, directly back into said unwithdrawn body of rinse liquid to keep the latter in agitation and prevent said residue from cooking to said heated surface, the undiverted portion of said stream being directed into said containers to rinse them, and interrupting said undiverted part only of said stream when no container is in a position to receive it.

11. The method of recovering from the interiors of containers a residue, adhering thereto, of a material which is damaged by excessive heat, which comprises progressively withdrawing a part only of a body of rinse liquid and directing it as a stream into the interiors of said containers in succession to rinse the containers, with the same liquid used over and over to remove some of the residue from the containers, heating the liquid by direct contact of the unwithdrawn part of the liquid body with a heated surface, and continuously diverting a portion only of the withdrawn liquid from said stream before it is discharged into said containers, directly back into said unwithdrawn body of rinse liquid to keep the latter in agitation and prevent said residue from cooking to said heated surface, the undiverted portion of said stream being directed into said containers to rinse them.

E. ROY ALLING.
HENNING A. TREBLER.

REFERENCES CITED

The following references are of record in the file of this patent:

UNITED STATES PATENTS

| Number | Name | Date |
|---|---|---|
| 745,752 | Adams et al. | Dec. 1, 1903 |
| 1,642,419 | Loew et al. | Sept. 3, 1927 |
| 1,108,539 | Zahm | Aug. 25, 1914 |
| 2,050,634 | Stegemann | Aug. 11, 1936 |
| 764,222 | Adams et al. | July 5, 1904 |
| 850,199 | Wright | Apr. 16, 1907 |
| 864,131 | Hood | Aug. 20, 1907 |
| 1,216,496 | Rice | Feb. 20, 1917 |
| 1,640,835 | Kendall | Aug. 20, 1927 |
| 1,620,116 | Maanum | Mar. 8, 1927 |
| 1,799,819 | Jensen | Apr. 7, 1931 |
| 1,568,081 | Mitton | Jan. 5, 1926 |
| 1,687,791 | Price | Oct. 16, 1928 |
| 1,846,564 | McEwan et al. | Feb. 23, 1932 |
| 1,737,938 | Miller | Dec. 3, 1929 |